UNITED STATES PATENT OFFICE.

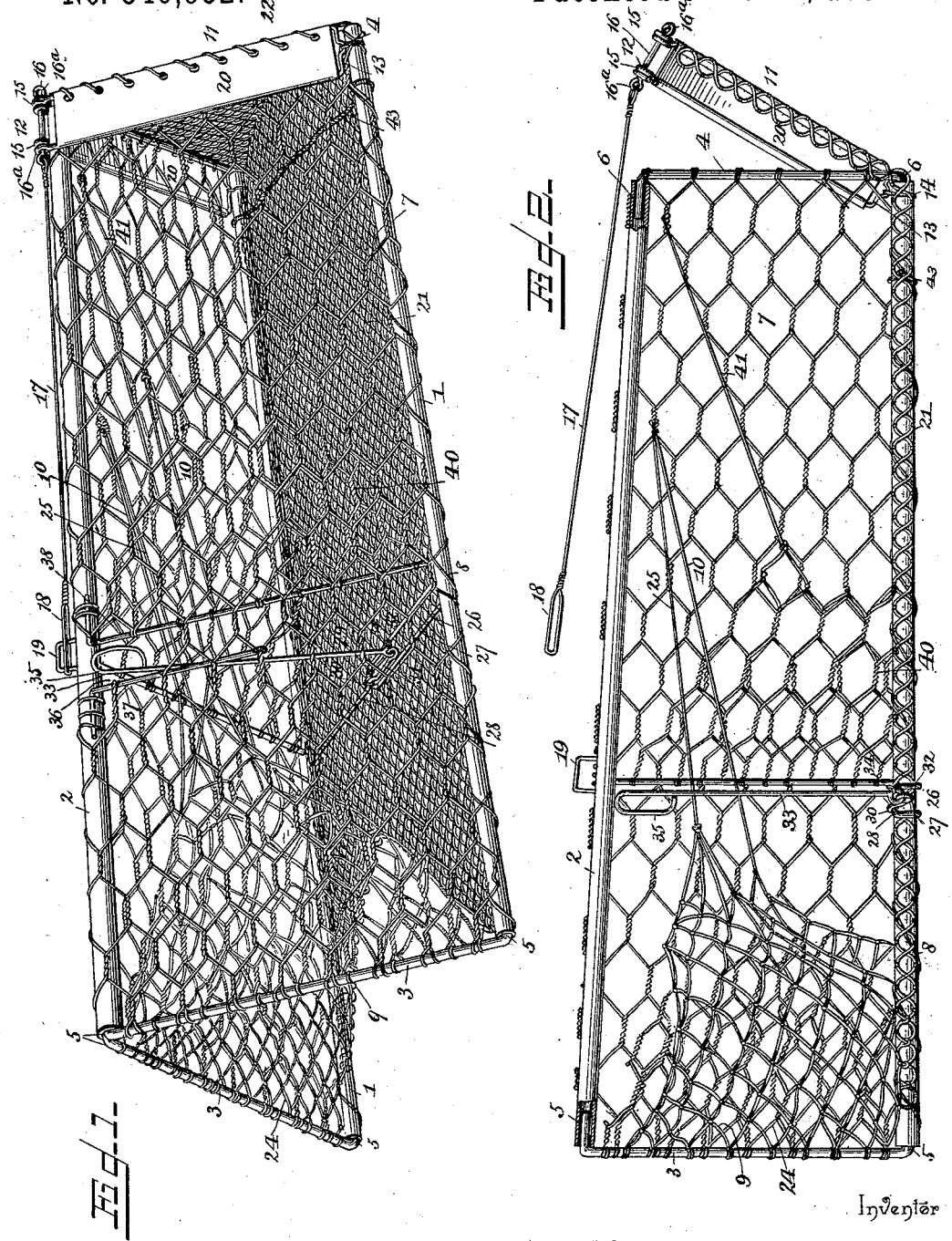

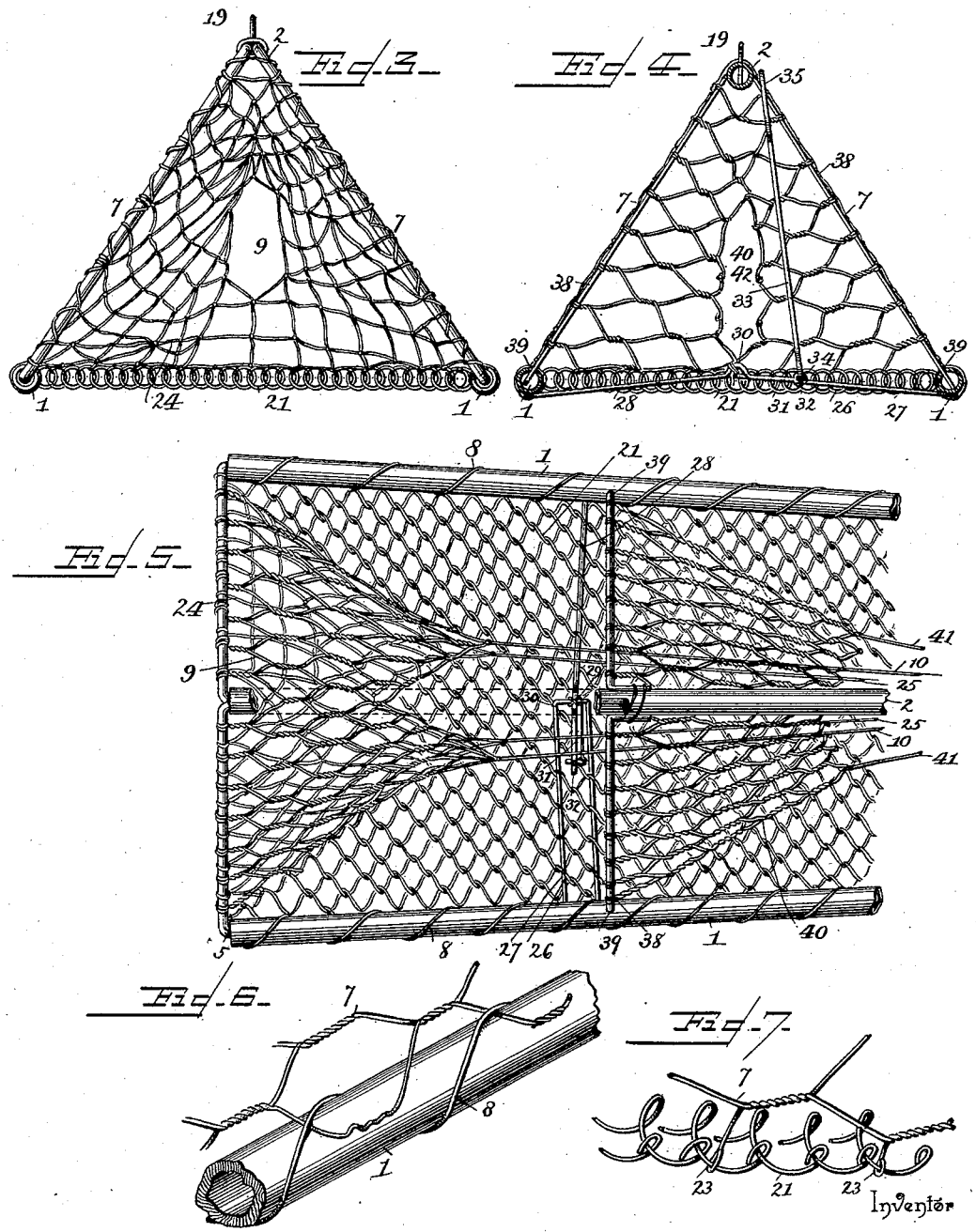

JOHN R. CRAWFORD, OF NORMAN, ALABAMA.

FISH-TRAP.

SPECIFICATION forming part of Letters Patent No. 540,952, dated June 11, 1895.

Application filed March 22, 1895. Serial No. 542,845. (No model.)

*To all whom it may concern:*

Be it known that I, JOHN R. CRAWFORD, a citizen of the United States, residing at Norman, in the county of Lamar and State of Alabama, have invented a new and useful Fish-Trap, of which the following is a specification.

My invention relates to fish traps, or traps designed for the capture of fish and other water game, the objects in view being to provide an improved construction whereby the trap may be folded into compact form for transportation; to provide simple means for holding the trap in its expanded or operative position; to provide improved means for strengthening and stiffening the exposed portions of the trap to prevent displacement of the parts thereof; to provide improved means for facilitating baiting of the trap and the removal of the game; and, furthermore, to provide an improved construction of pocket for the reception and guidance of the game to the inlet opening, and an improved construction of inlet opening whereby the entrance of the game is facilitated and subsequent escape prevented.

Further objects and advantages of the invention will appear in the following description, and the novel features thereof will be particularly pointed out in the appended claims.

In the drawings, Figure 1 is a perspective view of a trap constructed in accordance with my invention. Fig. 2 is a longitudinal section of the same, showing the rear closure open. Fig. 3 is a front view. Fig. 4 is a transverse section on the line 4 4 of Fig. 2. Fig. 5 is a detail plan view of the front end of the trap, partly broken away to show the construction of the outer or entrance pocket. Fig. 6 is a detail perspective view to show the manner of securing the netting to the lower horizontal frame-bars. Fig. 7 is a similar view to show the manner of securing the lower edge of the pocket to the bottom of the trap.

Similar numerals of reference indicate corresponding parts in all the figures of the drawings.

The frame of the improved trap comprises rearwardly convergent lower bars 1 and a central top bar 2 which is inclined slightly toward the plane of the lower bars toward the rear end of the trap, said bars being preferably tubular in construction, as shown in the drawings; and front and rear connecting rods 3 and 4 provided at their extremities with perpendicularly disposed studs or terminals 5 which are inserted in the ends of the bores of the tubular frame bars. The upper ends of the front connecting rods 3 are fitted in the front end of the top frame bar, while their lower ends are inserted in the ends of the bottom frame bars, whereby a pivotal connection is formed between the upper extremities of the rods and the top frame bar to provide for folding the frame by swinging the bottom frame bars toward the longitudinal center of the trap. The rear connecting rods 4 are provided with similar terminal studs 6 which are inserted, respectively, in the ends of the top and bottom frame bars, whereby a similar pivotal connection is provided. The frame thus constructed is covered to form inclined sides 7 by means of wire netting, the side edges of which are secured by means of a coiled fastening wire 8 to the bottom frame bars, and the intermediate portion of which passes over the top frame bar. The front end of the wire netting is extended around the front connecting rods 3 and is carried rearwardly and inwardly to form an entrance pocket 9, the free edges of the netting being held in place to maintain the sides of the pocket in the proper relative positions by means of guy-wires 10 which extend to the rear and are attached to fixed parts of the trap, as, for instance, suitable meshes of the sides 7.

The rear end of the trap is closed by means of a door 11, the frame of which consists of looped rods 12 doubled at their centers to form eyes 13 which are secured to the rear ends of the bottom frame bars by means of wire loops or ties 14, and the extremities of which are provided with rings 15 engaged with a pin 16 which is arranged parallel with the top bar of the frame. The extremities of this pin are bent to form eyes 16ª to prevent the eyes on the extremities of the rods from becoming displaced, and a draw-wire 17 is attached to the forward eye of the connecting pin and terminates in a loop 18 for engagement with a staple 19 secured to the top frame bar. The sides of the loops formed by the rods 12 may be connected by means of sheet metal plates 20, as shown in the drawings, to add stiffness to the frame of the door.

Connected at its front end to the lower end of the pocket and its side edges to the bottom side bars of the frame and extending to the rear end of the trap is the expansible and contractible bottom 21 formed of interlocking spiral coils of spring wire similar to that employed in spring wire bed-bottoms, whereby when the frame is folded said bottom contracts to occupy a minimum space, and when extended said bottom expands to the necessary width. The bottom of the trap is extended upward and is secured by means of a coil fastening wire 22 to the frame of the rear door, whereby the body portion or filling of the door is a continuation of and is integral with the bottom of the trap, said material possessing sufficient elasticity to hold the door in its open position when released.

The connection between the lower edge of the netting forming the entrance pocket and the front edge of the netting forming the bottom is accomplished by means of extensions 23 of the former engaging the coils of the bottom at intervals, and arranged within the entrance pocket to cover the netting forming the sides thereof is a lining 24 constructed of cotton twine similar to that used in fish nets, the edges thereof being attached to the front connecting rods and to the line of intersection of the netting forming the sides of the pocket and the bottom of the trap, and is held in place by means of guy-cords 25 which are constructed and arranged substantially as described in connection with the guy-wires.

For holding the frame in its expanded position I employ a stretcher 26 consisting of a loop 27 connected at its free ends to one bottom frame bar and a rod 28 connected to the other frame bar, said loop and rod being pivotally connected at their contiguous ends by means of a tie-wire 29 arranged at the inner end of the loop and engaging a bend or offset 30 near the free end of the rod. The rod extends beyond this pivotal connection to form an arm 31 terminating in an eye 32, and 33 represents an operating rod provided at its lower extremity with an eye 34 interlocked with the eye 32 and terminating at its upper end in a ring or handle 35. This operating rod extends through a slot 36 formed in one side of the trap and bounded by a stay-wire 37, secured at its upper end to the top frame bar, and a stay rod 38 which has one of a pair of rods secured at their upper extremities to the top frame bar and fitted at their lower ends in openings 39 in the bottom frame bars.

In addition to the entrance pocket above described, I may, and preferably do, employ an inner pocket 40 constructed of wire netting similar to that employed for the sides of the trap, secured at its front edges to the stay rods 38, and at its lower edges to the bottom of the trap, and held in place by means of guy-wires 41 to form an opening 42. By this construction the interior of the trap is divided into front and rear compartments from the first of which the game may pass to the second through said inner pocket and the opening provided at its rear end. A flexible strengthening brace 43, preferably constructed of tarred rope, is arranged transversely near the rear end of the trap to connect the bottom frame bars.

From the above description, it will be seen that the sides and entrance pocket of the trap are constructed of a single blank of wire netting doubled around the front connecting bars of the frame and extended rearwardly within the space inclosed by the trap with the edges thereof held in place by means of guy-wires; and that the parts of the frame of the trap are held from displacement by means of this netting which forms the sides of the trap.

It will be seen, furthermore, that the bottom and rear end of the trap are formed by a continuous blank of flexible and contractible netting which is adapted to fold into compact form by contraction when the frame of the trap is folded.

It will be seen, furthermore, that the manner of securing the free edges of the pockets provides for the openings therein being expanded with facility to allow the passage of the game and the immediate return thereof to their normal positions to prevent the escape of the game.

Various changes in the form, proportion, and the minor details of construction may be resorted to without departing from the spirit or sacrificing any of the advantages of this invention.

Having described my invention, what I claim is—

1. In a trap for fish and other water game, the side walls foldably connected at their upper edges, an expansible and contractible floor connecting the lower edges of the side walls, and means for preventing the egress of the game, substantially as specified.

2. In a trap for fish and other water game, the side walls foldably connected at their upper edges, an expansible and contractible floor connecting the lower edges of the side walls and consisting of interlocking spring coils, and means for preventing the egress of the game, substantially as specified.

3. In a trap for fish and other water game, the side walls foldably connected at their upper edges, an expansible and contractible floor connecting the lower edges of the side walls, and a re-entering pocket arranged between the front ends of the side walls and having its lower edges connected to the front edge of said floor, substantially as specified.

4. In a trap for fish and other water game, the side walls foldably connected at their upper edges, an expansible and contractible floor connecting the lower edges of the side walls, a door or closure arranged at the rear end of the trap and having its frame pivotally connected with the side walls, the body portion or filling of said door consisting of an extension of said floor, and means for preventing the egress of the game, substantially as specified.

5. In a trap for fish and other water game, a frame having bottom side bars and a central top bar connected by rods which are pivotally mounted upon the central top bar, netting connecting said bars to form the sides of the trap, an expansible and contractible floor, and means for preventing the egress of the game, substantially as specified.

6. In a trap for fish and other water game, a frame having side bottom and central top bars, connecting rods between the side bottom bars and the central top bar and pivotally connected to the latter, netting secured at its rear end to the connecting bars, at its side edges to the bottom side bars, extending at its center over the central top bar, at its front end around the front connecting bars and rearwardly to form an entrance pocket, and an expansible and contractible floor, substantially as specified.

7. In a trap for fish and other water game, a frame having side bottom and central top bars, and front and rear connecting rods between said bars, said connecting rods being provided with terminal studs to engage sockets in the extremities of the bars, netting secured at its rear end to the rear connecting bars, at its side edges to the side bottom bars and extending at its front end around the front connecting bars, guy-wires connected to the front edge of the netting to extend the same rearwardly and inwardly to form an entrance pocket, and an expansible and contractible floor, substantially as specified.

8. In a trap for fish and other water game, a frame comprising tubular side bottom bars, a tubular central top bar, front and rear connecting rods provided with terminal studs fitted in the extremities of the bores of said bars, a continuous blank of netting secured at its side edges to the side bottom bars and extending over the central top bar, means for securing the front and rear ends of the netting to the connecting rods, an entrance pocket located between the front ends of the frame bars, and an expansible and contractible floor, substantially as specified.

9. In a trap for fish and other water game, the combination with side walls foldably connected at their upper edges, a re-entering pocket between the front ends of the walls, and an expansible and contractible floor connecting the lower edges of the side walls, of a lining of cotton netting arranged in said pocket, substantially as specified.

10. In a trap for fish and other water game, the combination with side walls foldably connected at their upper ends and having approximately parallel frame bars and interposed netting, a re-entering pocket between the front ends of the walls, and an expansible and contractible floor connecting the lower edges of the walls, of stay rods connecting the approximately parallel bars of the side walls and arranged approximately in the planes of the sides of the side walls, and an inner pocket having its sides attached to said stay rods and held in place by guy-wires, substantially as specified.

11. In a trap for fish and other water game, the side walls foldably connected at their upper ends, an expansible and contractible floor, means for preventing the egress of game, and a stretcher connecting the lower edges of the side walls and comprising rods secured at their outer ends to walls and pivotally connected at their inner ends, one of said rods being extended beyond the pivotal connection to form an arm, and an operating rod connected to the extremity of said arm and projecting upward through an opening in one of the side walls, substantially as specified.

12. In a trap for fish and other water game, the combination with top and side approximately parallel frame bars, and connecting rods between said bars, said connecting rods being pivotally connected to the top bar, an expansible and contractible floor connecting the bottom bars, and a re-entering pocket, of a rear door or closure having a frame constructed of wire loops pivotally connected at their lower ends to the rear ends of the bottom frame bars, a pin connecting the upper extremities of the loops, stiffening plates between the sides of the loops, a draw-wire connected to said pin, and a staple on the top bar for engagement with a terminal loop in the draw-wire, substantially as specified.

In testimony that I claim the foregoing as my own I have hereto affixed my signature in the presence of two witnesses.

JOHN R. CRAWFORD.

Witnesses:
  THOS. L. EGGLESTON,
  J. H. VAUGHAN.